United States Patent
Schmidt

(10) Patent No.: US 7,731,165 B2
(45) Date of Patent: Jun. 8, 2010

(54) HOOD SUPPORT

(75) Inventor: Leo M. Schmidt, Seattle, WA (US)

(73) Assignee: PACCAR Inc, Bellevue, WA (US)

( * ) Notice: Subject to any disclaimer, the term of this patent is extended or adjusted under 35 U.S.C. 154(b) by 251 days.

(21) Appl. No.: 11/840,832

(22) Filed: Aug. 17, 2007

(65) Prior Publication Data

US 2009/0044998 A1    Feb. 19, 2009

(51) Int. Cl.
*F16F 9/30* (2006.01)

(52) U.S. Cl. .......................... 267/195; 267/2; 180/69.2

(58) Field of Classification Search ............... 180/69.2, 180/69.21, 69.22, 69.23, 69.24, 69.25, 89.13, 180/89.14, 89.15, 89.16, 89.17, 89.18, 89.19; 296/35.1, 76, 181, 183, 187; 267/64.12, 267/195

See application file for complete search history.

(56) References Cited

U.S. PATENT DOCUMENTS

| | | | | |
|---|---|---|---|---|
| 2,434,598 | A | | 1/1948 | Stegall |
| 4,449,702 | A | * | 5/1984 | Hasegawa ................. 267/64.12 |
| 4,596,383 | A | * | 6/1986 | Howard .................... 267/64.12 |
| 4,634,170 | A | * | 1/1987 | Lach ........................... 296/76 |
| 4,824,082 | A | * | 4/1989 | Schaupp ..................... 267/120 |
| 4,890,703 | A | * | 1/1990 | Hathaway ................... 188/300 |
| 4,938,520 | A | | 7/1990 | Shelton |
| 5,120,030 | A | * | 6/1992 | Lin et al. .................... 267/120 |
| 5,358,225 | A | * | 10/1994 | Volpel et al. .............. 267/64.12 |
| 5,730,240 | A | | 3/1998 | Hoffman |
| 5,749,425 | A | | 5/1998 | Cudden |
| 5,941,330 | A | * | 8/1999 | Miller et al. .............. 180/89.15 |
| 5,975,228 | A | | 11/1999 | Parfitt |
| 6,167,977 | B1 | | 1/2001 | Adamson |
| 6,273,405 | B2 | * | 8/2001 | Okamoto .................. 267/64.12 |
| 6,601,834 | B2 | | 8/2003 | Perry |
| 7,261,286 | B2 | * | 8/2007 | McConnell et al. ......... 267/195 |

OTHER PUBLICATIONS

International Search Report dated Jul. 7, 2008, issued in corresponding Application No. PCT/US07/18272, filed Aug. 17, 2007.

* cited by examiner

*Primary Examiner*—Glenn Dayoan
*Assistant Examiner*—Brodie Follman
(74) *Attorney, Agent, or Firm*—Christensen O'Connor; Johnson Kindness PLLC

(57) ABSTRACT

A hood support for a vehicle having a hood moveable between open and closed positions is provided. The hood support includes a spring assembly disposable between the vehicle hood and another portion of the vehicle. The spring assembly is moveable into an extended position to accommodate movement of the hood into the open position and moveable into a compressed position to accommodate movement of the hood into the closed position. The hood support further includes a lock tube surrounding a portion of the spring assembly and moveable relative to the spring assembly. The lock tube is selectively actuatable between a locked position, wherein the lock tube secures the spring assembly in the extended position, and an unlocked position, wherein the spring assembly is permitted to be displaced into the compressed position.

12 Claims, 6 Drawing Sheets

HOOD SUPPORT

BACKGROUND

Conventional heavy duty trucks have a large engine covering hood which tilts about a transverse pivot point located above the bumper to expose the engine for servicing. Although commonly made of lightweight materials, these hoods are nevertheless cumbersome to handle in part because of their heaviness and the relatively long moment arm between the center of gravity of the hood and the pivot axis. For example, the mass of the hood makes arresting its movement toward either the open or closed position a challenge.

A hood tilt assist mechanism is often disposed between the hood and a portion of the vehicle to slow the hood when it is moved into either the open or closed position. The hood tilt assist mechanism normally includes a counterbalancing device to control the movement of the hood, thereby assisting the user. The counterbalancing device may be an extension or compression spring, a cable, a shock-absorber, a gas spring, etc.

In addition to the hood tilt assist mechanism, the vehicle may also include an automatic locking device that secures the hood in the open position to prevent inadvertent closure of the hood and avoid injuring the operator. However, including a locking device separately from the hood tilt assist mechanism increases the number of assemblies within the truck. Moreover, many automatic lock designs include multiple moving parts, which increase assembly time and decreases production. Additionally, use of multiple moving parts within a lock causes the lock components to wear quickly and fail over time.

Thus, it is desired to provide a hood tilt assist mechanism having a simplified automatic locking system integrated therewithin.

SUMMARY

A hood support for a vehicle having a hood moveable between open and closed positions is provided. The hood support includes a spring assembly disposable between the vehicle hood and another portion of the vehicle. The spring assembly is moveable into an extended position to accommodate movement of the hood into the open position and moveable into a compressed position to accommodate movement of the hood into the closed position. The hood support further includes a lock tube surrounding a portion of the spring assembly and moveable relative to the spring assembly. The lock tube is selectively actuatable between a locked position, wherein the lock tube secures the spring assembly in the extended position, and an unlocked position, wherein the spring assembly is permitted to be displaced into the compressed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
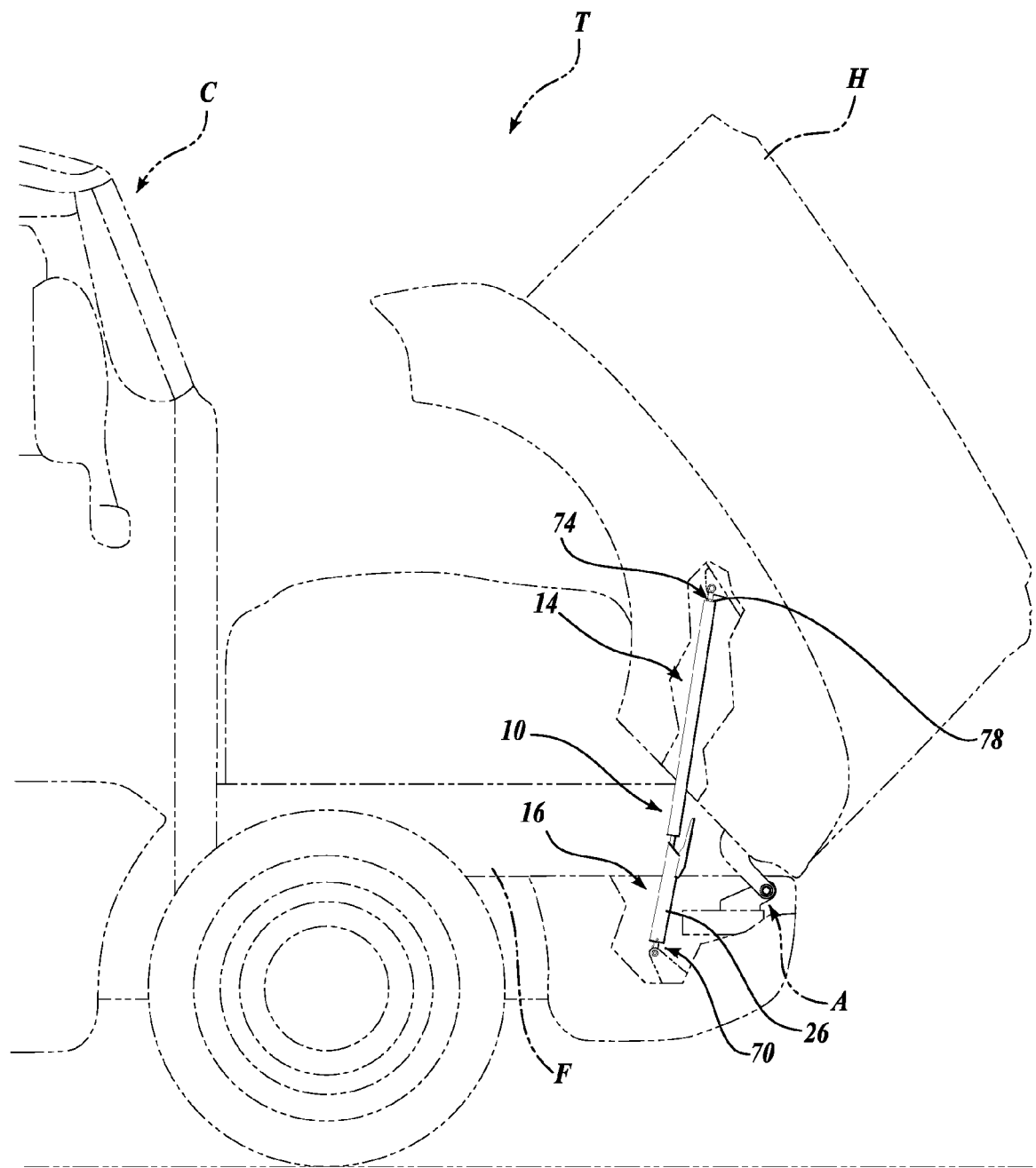
FIG. 1 is an environmental view of a representative embodiment of a hood support shown in combination with a vehicle hood assembly.

A hood support 10 constructed in accordance with one embodiment of the present disclosure is best seen by referring to FIG. 1. The hood support 10 is shown in combination with a heavy duty truck T having a cab C, a chassis or frame F, and a hood H. The hood H is pivotally coupled at its forward end to the frame F through a suitable hinge assembly A that is well known in the art. The hood H pivots about the hinge assembly A to move between open and closed positions. The hood support 10 is disposed between the hood H and the frame F and is adapted to control the movement of the hood H when it is moved between the open and closed positions. The hood support 10 also temporarily locks the hood H in the open position.

Figure 2:
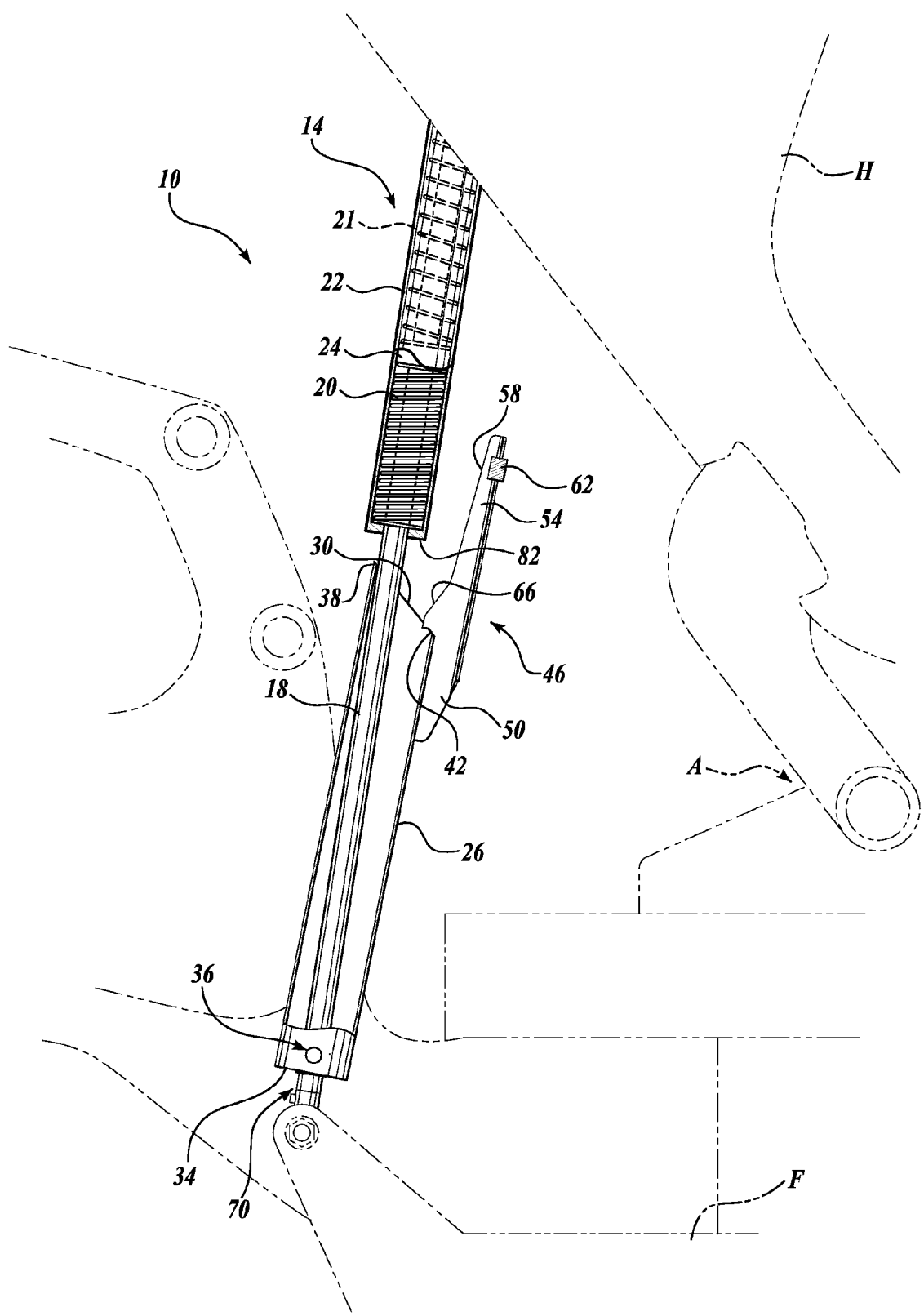
FIG. 2 is a side planar view of the hood support of FIG. 1 with portions removed for clarity and showing the hood support is shown in a first position.
Figure 3:
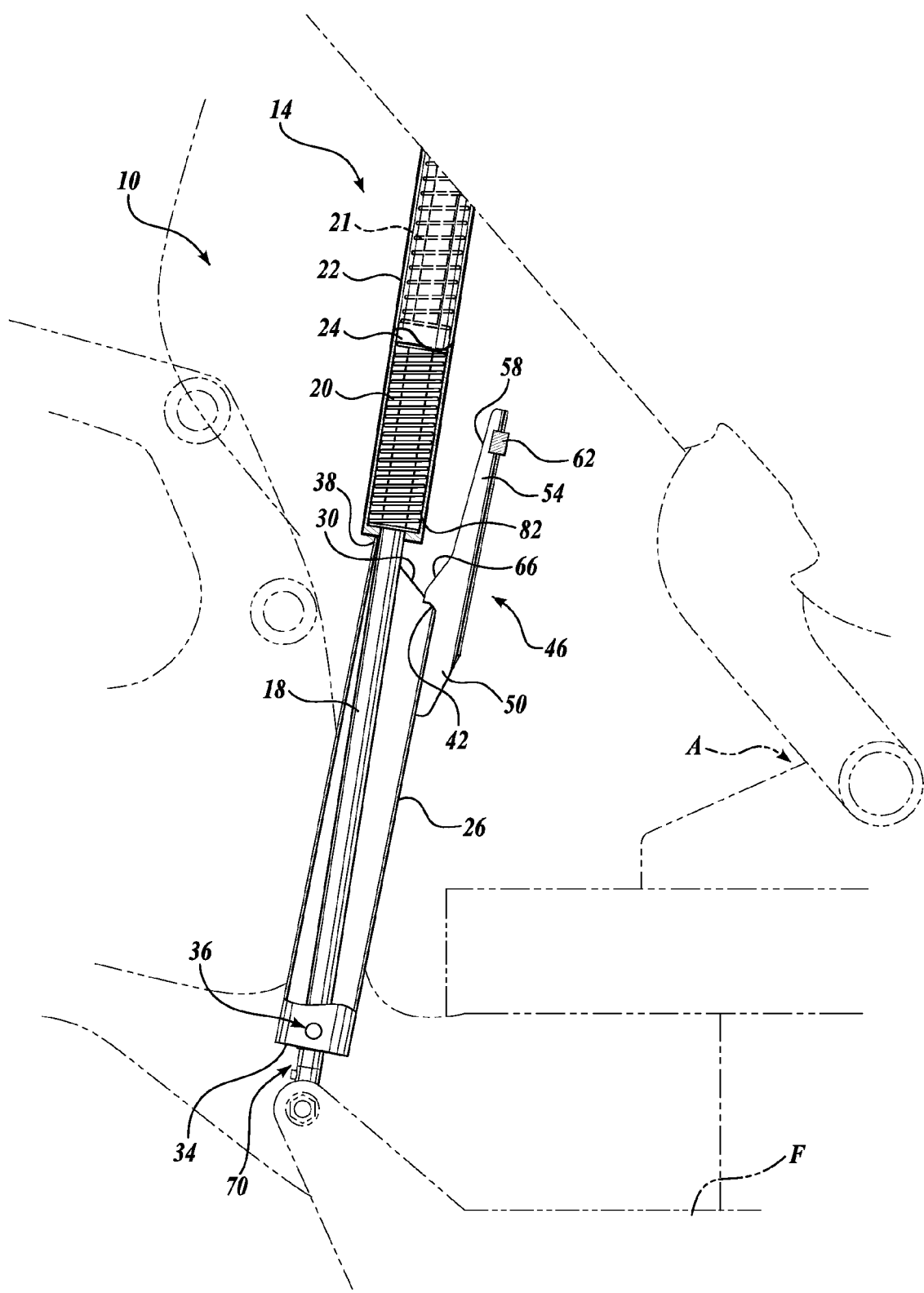
FIG. 3 is a side planar view of the hood support of FIG. 2, showing the hood support in a second position.

Referring now to FIGS. 2 and 3, the hood support 10 includes a spring assembly, or a spring strut 14 and a locking assembly 16 secured thereto. The spring strut 14 is adapted to slow the hood H as it is moved between the open and closed positions. The spring strut 14 may be any suitable off-the-shelf spring strut with the required spring rate to control the movement of the hood H between the open and closed positions. The spring strut 14 also has a suitable stroke length to position the spring strut 14 between the hood H and the frame F in both the open and closed positions.

The spring strut 14 includes a cylinder 22 that houses two counterbalanced springs 20 and 21. The cylinder 22 of the spring strut 14 includes an upper end 78 (FIG. 1) and a lower end 82 having an opening therein for slidably receiving a rod 18. The rod 18 is slidably disposed within the cylinder 22 and operably coupled to each spring 20 and 21 through a piston 24 or other support member such that the springs 20 and 21 are compressible and extendible by the rod 18. The rod 18 extends outwardly from the lower end 82 of the cylinder 22 and is received within a portion of the locking assembly 16. The counterbalanced springs 20 and 21 extend and compress as needed to accommodate the movement of the rod 18 within the cylinder 22 and the overall extension or compression of the spring strut 14. It should be appreciated that any other suitable spring assembly may instead be used, such as a dual direction gas spring or a compression or extension gas spring.

Figure 4:
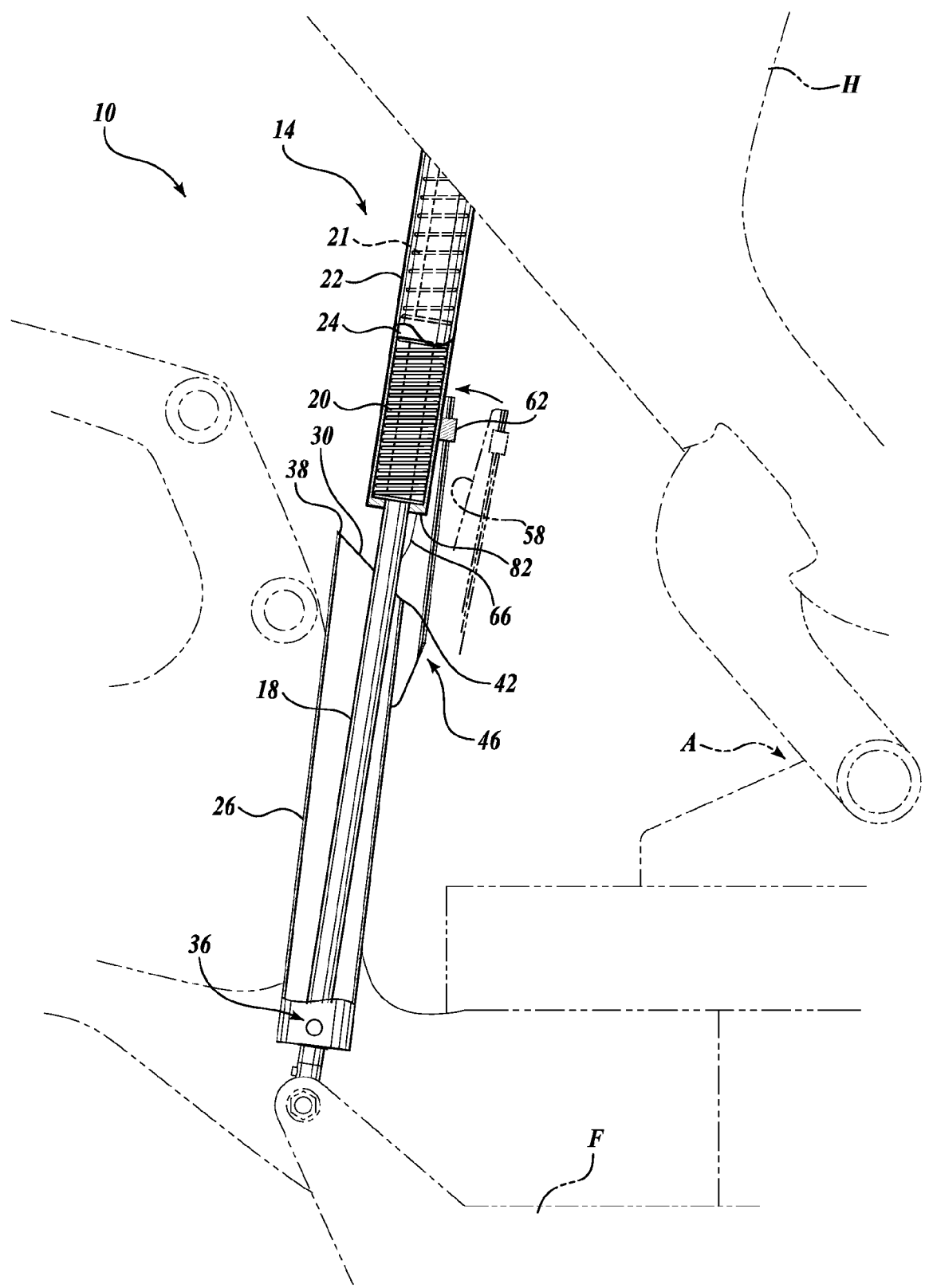
FIG. 4 is a side planar view of the hood support of FIG. 2, showing the hood support in a third position.
Figure 5:
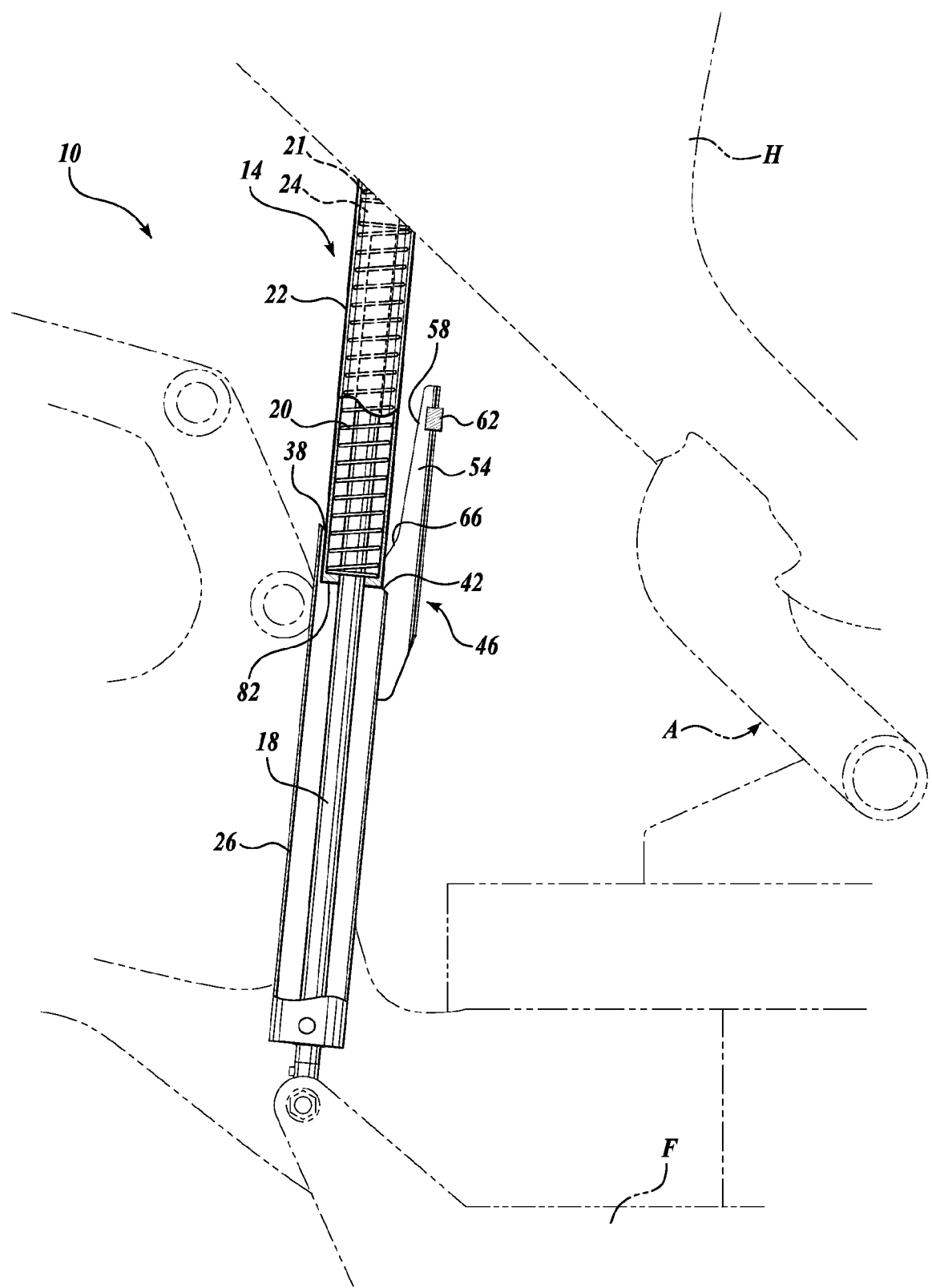
FIG. 5 is a side planar view of the hood support of FIG. 2, showing the hood support in a fourth position.

The locking assembly 16 includes a lock tube 26 that is adapted to receive the spring strut 14 therewithin. The rod 18 is received within a first tube end 30 of the lock tube 26 and extends downwardly into the lock tube 26. The rod 18 passes through an opening in a second tube end 34 of the lock tube 26 and is thereafter received within a lower end fitting 70. The lower end fitting 70 is adapted to pivotally mount the rod 18 to the frame F. The interior of the lock tube 26 is also of a diameter sufficiently large to receive the cylinder 22 therewithin, as shown in FIGS. 4 and 5. In this manner, when the spring strut 14 compresses a predetermined amount, the cylinder 22 is slidably receivable within the lock tube 26 to allow the spring strut 14 to fully compress and the hood H to close. Although the lock tube 26 is preferably cylindrical in shape, it should be appreciated that any suitable shape may be used, such as rectangular.

The lock tube 26 is movably secured to the spring strut 14 such that the lock tube 26 may rotate relative to the spring strut 14 when the hood H is moved between open and closed positions. Preferably, the second lock tube end 34 of the lock tube 26 is pivotally coupled to the rod 18 in any suitable manner, such as with a pin assembly 36 that passes through both the lock tube 26 and the rod 18. The lock tube 26 may instead be pivotally coupled to the frame F in any suitable manner that allows the lock tube 26 to rotate relative to the spring strut 14.

Referring to FIG. 2, the first tube end 30 of the lock tube 26 is angled to define an upper first tube end portion 38 and a lower first tube end portion 42. Secured to the exterior of the lock tube 26 near the lower first tube end portion 42 of the first tube end 30 is a lock handle 46. The lock handle 46 includes a tube mating portion 50 secured to the exterior of the lock tube 26 and a handle portion 54 extending upwardly therefrom. The tube mating portion 50 is secured to the exterior of the lock tube 26 in any suitable manner, such as by welding. The handle portion 54 extends upwardly from the lower first tube end portion 42 of the first tube end 30.

The handle portion 54 includes a cylinder engaging surface 58 formed on the interior of the handle portion 54 and suitably contoured for engaging the cylinder 22 of the spring strut 14. A magnet 62 is disposed within the upper end of the handle portion 54 and is substantially flush with the cylinder engaging surface 58. The magnet 62 secures the cylinder 22 against the cylinder engaging surface 58 when the lock tube 26 is rotated and the lock handle 46 engages the cylinder 22 (See FIG. 4). Thus, when the spring strut 14 compresses and the cylinder 22 is moved along the rod 18, the cylinder 22 slides against the cylinder engaging surface 58. The cylinder engaging surface 58 provides path that guides the cylinder 22 downwardly towards the lock tube 26.

The handle portion 54 further includes a cam surface 66 formed at the bottom interior of the handle portion 54 that extends outwardly from the cylinder engaging surface 58 towards the lock tube 26. The cam surface 66 is adapted to urge the cylinder 22 into the lock tube 26 as the cylinder 22 slides downwardly against the cylinder engaging surface 58. Additionally, the cam surface 66 separates the cylinder 22 from the magnet 62 as the cylinder 22 slides downwardly to allow the cylinder 22 to be received within the lock tube 26.

Referring back to FIG. 1, the lower end fitting 70 pivotally secures the rod 18 to the frame F. A similar upper end fitting 74 is secured to the cylinder upper end 78 for pivotally mounting the cylinder 22 to the hood H. The upper and lower end fittings 70 and 74 may be any suitable fitting assembly adapted to pivotally secure the rod 18 to the frame F and the cylinder 22 to the hood H. With the spring strut 14 of the hood support 10 pivotally secured to the frame F and the hood H, the hood support 10 accommodates the movement of the hood H when the hood H is moved between the open and closed positions. It should be appreciated that the hood support 10 may also accommodate the hood movement with the cylinder upper end 78 pivotally secured to the frame F and the rod 18 pivotally secured to the hood H.

Figure 6:
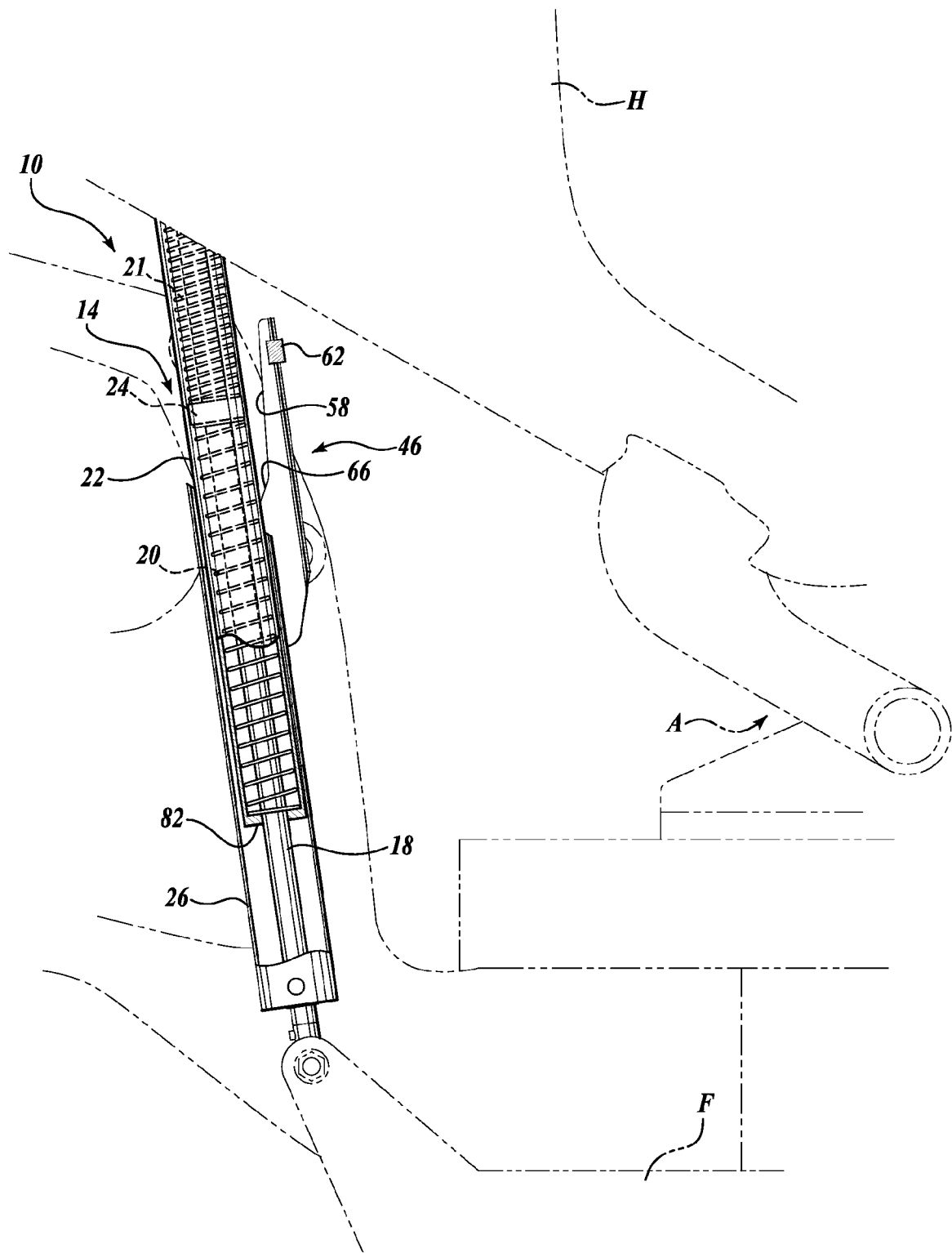
FIG. 6 is a side planar view of the hood support of FIG. 2, showing the hood support in a fifth position and the engine hood assembly in a closed position.

FIGS. 1-6 show the movement and operation of the hood support 10 as the hood H is moved between the open and closed positions. FIG. 6 shows the hood H in a closed position. When the hood H is in the closed position, the spring strut 14 is compressed due to the weight of the hood H, and the cylinder 22 is received within the lock tube 26.

Referring to FIG. 1, the hood H is opened by lifting the rear portion of the hood H and rotating the hood H in a clockwise direction about the hinge assembly A. As the hood H is lifted into the open position, the spring strut 14 extends, and the cylinder 22 moves upwardly out of the lock tube 26. To aid the operator, the springs 20 and 21 are preferably adapted to urge the hood H at least slightly into the open position while controlling the movement of the hood H. As the hood H is being opened, the spring strut 14 pivots at the lower end fitting 70 and the upper end fitting 74 to accommodate the clockwise rotation of the hood H about the hinge assembly A. The hood H is lifted until the center of gravity of the hood H pivots about the hood assembly A and the cylinder 22 is no longer received within the lock tube 26, thereby placing the hood H in the open position.

Referring to FIG. 2, with the hood H in the open position, the hood support 10 is disposed between the hood H and the frame F at an angle such that the lock tube 26 rotates clockwise about the pin assembly 36 due to the gravitational effects on the lock tube 26. The lock tube 26 rotates clockwise until the interior of the lock tube 26 engages the rod 18. As such, the lock tube 26 is positioned against the rod 18 such that the upper first tube end portion 38 is situated substantially beneath the cylinder 22, or in a locked position. With the lock tube 26 in the locked position, the spring strut 14 cannot compress. More specifically, the upper first tube end portion 38 of the lock tube 26 prevents the cylinder 22 from sliding downwardly along the rod 18. Accordingly, the hood H is locked in the open position, thereby preventing any accidental closure and avoiding possible injury.

FIG. 3 depicts the hood H being moved towards the closed position with the lock tube 26 in the locked position. This may occur if, for instance, a strong wind blows against the hood H. The hood H rotates counterclockwise until the cylinder lower end 82 engages the upper first tube end portion 38, or the spring-engaging portion, of the lock tube 26. With the lock tube 26 in the locked position, the cylinder 22 cannot slide along the rod 14 to allow the spring strut 14 to compress and the hood H to close. As such, the hood support 10 is maintained in the open position.

Referring to FIG. 4, to unlock the hood support 10 and close the hood H, the operator grasps the lock handle 46 and pushes the lock handle 46 and lock tube 26 toward the spring strut 14 until the cylinder engaging surface 58 and the magnet 62 engage the cylinder 22. The magnet 62 secures the lock handle 46 to the cylinder 22, thereby preventing the lock tube 26 from rotating clockwise back into the locked position.

Referring to FIG. 5, the weight of the hood H as well as any external downward force exerted by the operator causes the spring strut 14 to compress in a controlled manner. As the spring strut 14 compresses, the cylinder 22 travels downwardly against the cylinder engaging surface 58. The magnet 62 maintains contact between the cylinder engaging surface 58 and the cylinder 22 such that the lock tube 26 is maintained in the unlocked position as the spring strut 14 compresses. The spring strut 14 continues to compress and the cylinder 22 continues to travel downwardly against the cylinder engaging surface 58 until the cylinder engages the cam portion 66.

When the cylinder lower end 82 engages the cam portion 66 and travels downwardly along the cam surface 66, it is urged away from the lock handle 46 and towards the lock tube 26. The cylinder lower end 82 travels along the cam surface 66 until the cylinder 22 separates from the magnet 62. As such, the lock handle 46 is no longer secured to the cylinder 22, and gravity causes the lock tube 26 to rotate clockwise.

However, the upper first tube end portion 38 engages the cylinder 22 as the lock tube 26 is rotating clockwise, which prevents the lock tube 26 from moving into the locked position. Thus, the spring strut 14 continues to compress and the cylinder 22 is received within the lock tube 26. The spring strut 14 compresses until the hood H is closed, as shown in FIG. 6.

While illustrative embodiments have been illustrated and described, it will be appreciated that various changes can be made therein without departing from the spirit and scope of the present disclosure.

The embodiments of the invention in which an exclusive property or privilege is claimed are defined as follows:

1. A hood support for a vehicle having a hood moveable between open and closed positions, the hood support comprising:
   (a) a spring assembly disposable between a vehicle hood and another portion of the vehicle, wherein the spring assembly is moveable into an extended position to accommodate movement of the hood into the open position, and wherein the spring assembly is moveable into a compressed position to accommodate movement of the hood into the closed position;
   (b) a lock tube surrounding a portion of the spring assembly and pivotally mountable to one of the spring assembly and the vehicle such that the lock tube is rotatable about a pivot point relative to the spring assembly, the lock tube being selectively actuatable between a locked position, wherein the lock tube secures the spring assembly in the extended position, and an unlocked position, wherein the spring assembly is permitted to be displaced into the compressed position; and
   (c) a handle secured to the lock tube and configured to secure the lock tube in the unlocked position said handle includes a magnet adapted to engage a portion of the spring assembly to secure the lock tube in the unlocked position and said handle includes a cam portion adapted to separate the spring assembly from the magnet and urge the spring assembly into the lock tube as the spring assembly compresses.

2. The hood support of claim 1, wherein the spring assembly is a spring strut having a rod slidably disposed within a cylinder.

3. The hood support of claim 2, wherein the lock tube includes a first lock tube end with a spring-engaging portion.

4. The hood support of claim 3, wherein the lock tube rotates relative to the spring assembly to position the spring-engaging portion beneath a portion of the cylinder when the lock tube is in the locked position.

5. The hood support of claim 4, wherein the spring-engaging portion is adapted to engage a first end of the cylinder to secure the spring assembly in the extended position.

6. The hood support of claim 3, wherein the handle is engageable with the spring assembly to secure the lock tube in the unlocked position.

7. The hood support of claim 1, wherein the spring-engaging portion engages the spring assembly to prevent the lock tube from rotating into the locked position after the spring assembly is separated from the magnet.

8. A hood support for a vehicle having a hood moveable between open and closed positions, the hood support comprising:
   (a) a spring strut having a rod slidably disposed within a cylinder, the spring strut disposable between a vehicle hood and another portion of the vehicle, wherein the spring strut is moveable into an extended position to accommodate movement of the hood into the open position, and wherein the spring strut is moveable into a compressed position to accommodate movement of the hood into the closed position; and
   (b) a lock tube surrounding a portion of the spring strut and moveable relative to the spring strut, the lock tube being selectively actuatable between a locked position, wherein a portion of the lock tube is positioned beneath the cylinder to secure the spring strut in the extended position, and an unlocked position, wherein the portion of the lock tube is removed from beneath the cylinder such that the spring strut is permitted to be displaced into the compressed position; and
   (c) a handle secured to the lock tube and adapted to secure the lock tube in the unlocked position, said handle includes a magnet adapted to engage the cylinder to secure the lock tube in the unlocked position and said handle includes a cam portion adapted to separate the cylinder from the magnet and urge the cylinder into the lock tube as the spring strut compresses.

9. The hood support of claim 8, wherein the portion of the lock tube engages a lower end of the cylinder to secure the spring strut in the extended position.

10. The hood support of claim 8, wherein the spring-engaging portion engages the spring strut to prevent the lock tube from rotating into the locked position after the spring strut is separated from the magnet.

11. A hood support for a vehicle having a hood moveable between open and closed positions, the hood support comprising:
   (a) a spring strut having a rod slidably disposed within a cylinder, the spring strut disposable between a vehicle hood and another portion of the vehicle, wherein the spring strut is moveable into an extended position to accommodate movement of the hood into the open position, and wherein the spring strut is moveable into a compressed position to accommodate movement of the hood into the closed position;
   (b) a lock tube surrounding a portion of the spring strut and moveable relative to the spring strut, the lock tube being selectively actuatable between a locked position, wherein a portion of the lock tube is positioned beneath the cylinder to secure the spring strut in the extended position, and an unlocked position, wherein the portion of the lock tube is removed from beneath the cylinder such that the spring strut is permitted to be displaced into the compressed position; and
   (c) means for securing the lock tube in the unlocked position, wherein said means for securing the lock tube in the unlocked position includes a handle secured to the lock tube and securable to the spring strut, the handle includes a magnet adapted to engage a portion of the spring strut as the spring strut compresses, and the handle includes a cam portion adapted to separate the cylinder from the magnet and urge the cylinder into the lock tube as the spring strut compresses.

12. The hood support of claim 11, wherein the portion of the lock tube engages the spring strut to prevent the lock tube from rotating into the locked position after the spring strut is separated from the magnet.

* * * * *